United States Patent
Wilson

(10) Patent No.: US 12,103,712 B2
(45) Date of Patent: Oct. 1, 2024

(54) AERO-BRAKING ASSISTED ASCENDING NODE PLANE CHANGES USING DIFFERENTIAL J2 PRECESSION

(71) Applicant: Atomos Nuclear and Space Corporation, Denver, CO (US)

(72) Inventor: Kieran Wilson, Lafayette, CO (US)

(73) Assignee: Atomos Nuclear and Space Corporation, Denver, CO (US)

( * ) Notice: Subject to any disclaimer, the term of this patent is extended or adjusted under 35 U.S.C. 154(b) by 5 days.

(21) Appl. No.: 18/143,931

(22) Filed: May 5, 2023

(65) Prior Publication Data
US 2023/0356861 A1 Nov. 9, 2023

Related U.S. Application Data

(60) Provisional application No. 63/339,294, filed on May 6, 2022.

(51) Int. Cl.
*B64G 1/24* (2006.01)
*B64G 1/26* (2006.01)

(52) U.S. Cl.
CPC .......... *B64G 1/2427* (2023.08); *B64G 1/2421* (2023.08); *B64G 1/26* (2013.01)

(58) Field of Classification Search
CPC .................................................. B64G 1/2427
See application file for complete search history.

(56) References Cited

U.S. PATENT DOCUMENTS

| 6,059,233 A | * | 5/2000 | Koppel | B64G 1/242 244/158.5 |
| 2015/0353209 A1 | * | 12/2015 | Turner | B64G 1/10 244/158.6 |
| 2022/0185506 A1 | * | 6/2022 | Kawamura | G01S 13/90 |

FOREIGN PATENT DOCUMENTS

WO 2020230252 A1 11/2020

OTHER PUBLICATIONS

Rodriquez, Kari, "International Search Report and Written Opinion of the ISA for PCT Application No. PCT/US23/21182," mailed date Jul. 27, 2023, 7 Pages.

* cited by examiner

*Primary Examiner* — Richard G Davis
(74) *Attorney, Agent, or Firm* — Neugeboren O'Dowd PC

(57) ABSTRACT

A method of moving a spacecraft from an initial orbit to a final orbit includes providing a spacecraft with thrusters traveling in an initial orbit that has a first RAAN. Thrusters are activated to move the spacecraft into a transfer orbit having more eccentricity than the initial orbit. A RAAN of the transfer orbit changes over time toward a target RAAN. The spacecraft enters an aerobraking orbit wherein the spacecraft is exposed to increased atmospheric drag to reduce orbit energy and reduce an apoapsis radius. Thrusters may be activated to increase the periapsis radius of the aerobraking orbit and cause the spacecraft to move into the final orbit, the final orbit having a final RAAN different from the first RAAN.

20 Claims, 4 Drawing Sheets

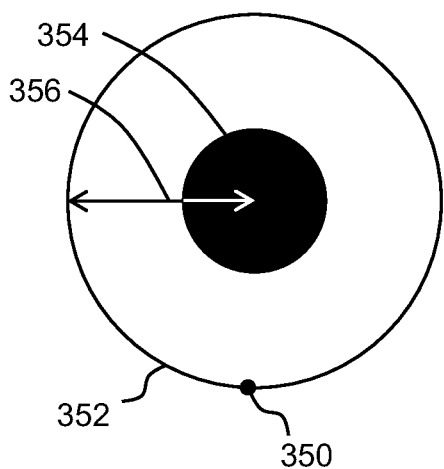
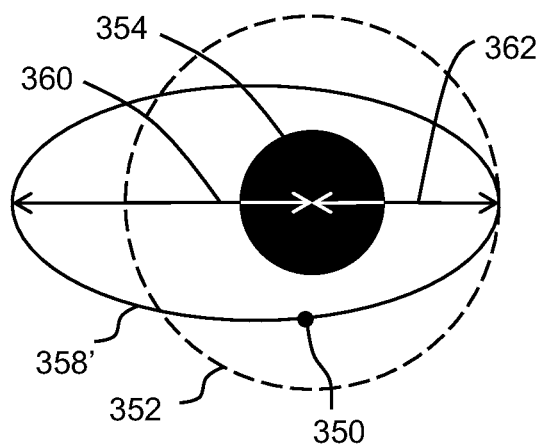
FIG. 3A    FIG. 3B
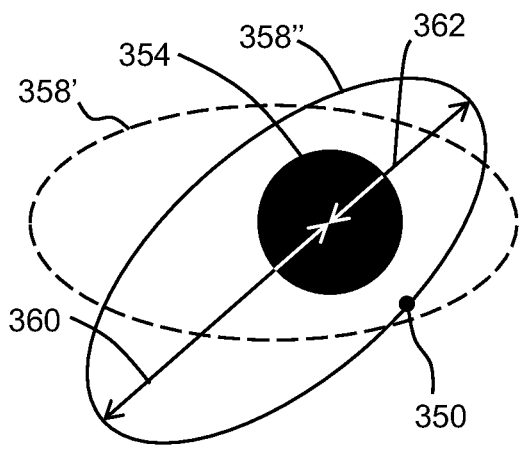
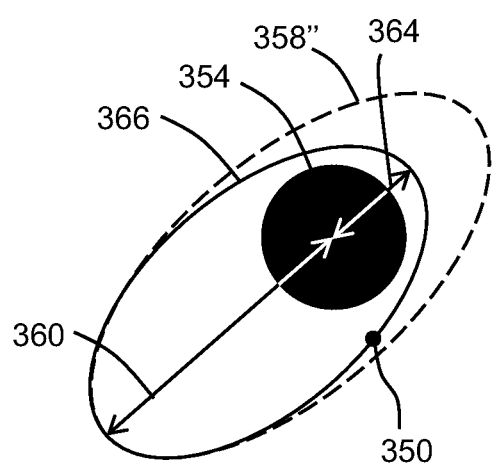
FIG. 3C    FIG. 3D
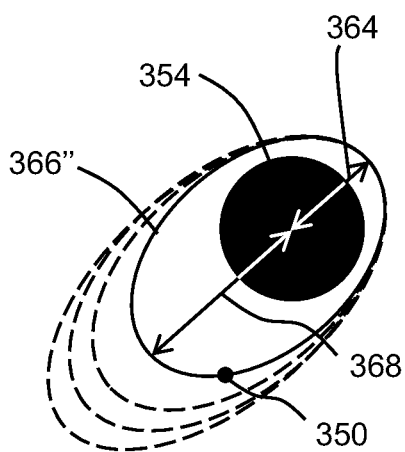
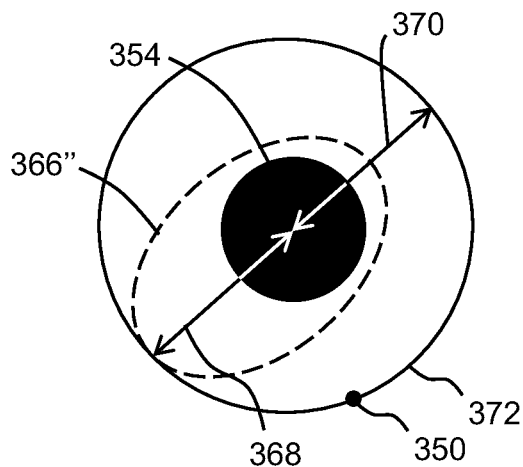
FIG. 3E    FIG. 3F ns AERO-BRAKING ASSISTED ASCENDING
NODE PLANE CHANGES USING
DIFFERENTIAL J2 PRECESSION

REFERENCE TO RELATED APPLICATIONS

The present application claims the benefit of U.S. Provisional Pat. App. No. 63/339,294, filed 2022 May 6 and titled "Aero-Braking Assisted Ascending Node Plane Changes Using Differential J2 Precession," which application is incorporated herein by reference in its entirety.

FIELD OF THE INVENTION

The present invention relates to methods of transferring spacecraft between different orbital planes.

DESCRIPTION OF RELATED ART

Various types of maneuvering operations are required for spacecraft while in space. For example, a satellite may initially be launched into an insertion or "parking" orbit, then maneuvered into a geosynchronous altitude. Smaller adjustments may be required for spacecraft to stay in its intended orbit or to shift out of a particular orbit (see, for example, Federal Aviation Administration, "Maneuvering in Space," Advanced Aerospace Medicine On-Line, Section 111.4.1.6 (https://www.faa.gov/about/office_org/headquarters_offices/ays/offices/aam/cami/library/onl ine_libraries/aerospace_medicine/tutorial/media/III.4.1.5_Maneuvering_in_Space.pdf, retrieved 2023-04-29), or David A. Vallado, *Fundamentals of Astrodynamics and Applications*, $4^{th}$ ed., Space Technology Library, 2013, section 6.4.3).

One example of a spacecraft maneuvering operations is a simple plane change, in which only the direction of orbital velocity is changed, while the orbital speed remains unchanged. For instance, a plane change may be useful to change the right ascension of the ascending node, thus changing the inclination of the spacecraft orbit, such as when maneuvering a remote-sensing satellite to pass over a certain point on Earth at a specific time of the day.

In practice, however, a plane change may not be so simple. A variety of parameters must be taken into account in providing the appropriate adjustments in the thruster systems according to the specific orbit, relative location with respect to the Earth, and others variables.

Thus, there is a need for an improved method for implementing plane changes for spacecraft.

SUMMARY OF THE INVENTION

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an aspect, a method of moving a spacecraft from an initial orbit to a final orbit is disclosed. The method includes providing a spacecraft with thrusters traveling in an initial orbit, wherein the initial orbit has an initial semimajor axis and an initial right ascension of the ascending node ("RAAN"). The method may further include defining a target RAAN, a target apoapsis radius, and a target periapsis radius for a final orbit, and activating the thrusters such that the spacecraft moves from the initial orbit to a transfer orbit. The transfer orbit includes a transfer orbit semimajor axis with more eccentricity than the initial semimajor axis, a transfer orbit periapsis region having a transfer orbit periapsis radius, and a transfer orbit RAAN, wherein the transfer orbit RAAN changes with each revolution in the transfer orbit due to earth's oblateness. The method may further include propagating the spacecraft in the transfer orbit until the second RAAN is substantially equal to the target RAAN and activating thrusters when the spacecraft is in the transfer orbit apoapsis region to reduce the transfer orbit periapsis radius such that the spacecraft moves from the transfer orbit to an aerobraking orbit. The aerobraking orbit includes an aerobraking orbit apoapsis radius and an aerobraking orbit periapsis region having an aerobraking orbit periapsis radius. The method may further include reducing an orbit energy of the spacecraft by exposing the spacecraft to atmospheric drag, propagating the spacecraft in the aerobraking orbit until the aerobraking orbit apoapsis radius is substantially equal to the target apoapsis radius, and activating the thrusters over one or more orbits to increase the aerobraking orbit periapsis radius such that the spacecraft travels in a final orbit. The final orbit includes a final RAAN substantially equal to the target RAAN, a final apoapsis radius substantially equal to the target apoapsis radius, and a final periapsis radius substantially equal to the target periapsis radius.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

The appended drawings illustrate only some implementation and are therefore not to be considered limiting of scope.

FIGS. 3A-3F schematically illustrate the steps of moving a spacecraft between a first orbit and a final orbit, in accordance with an embodiment.

Figure 1:
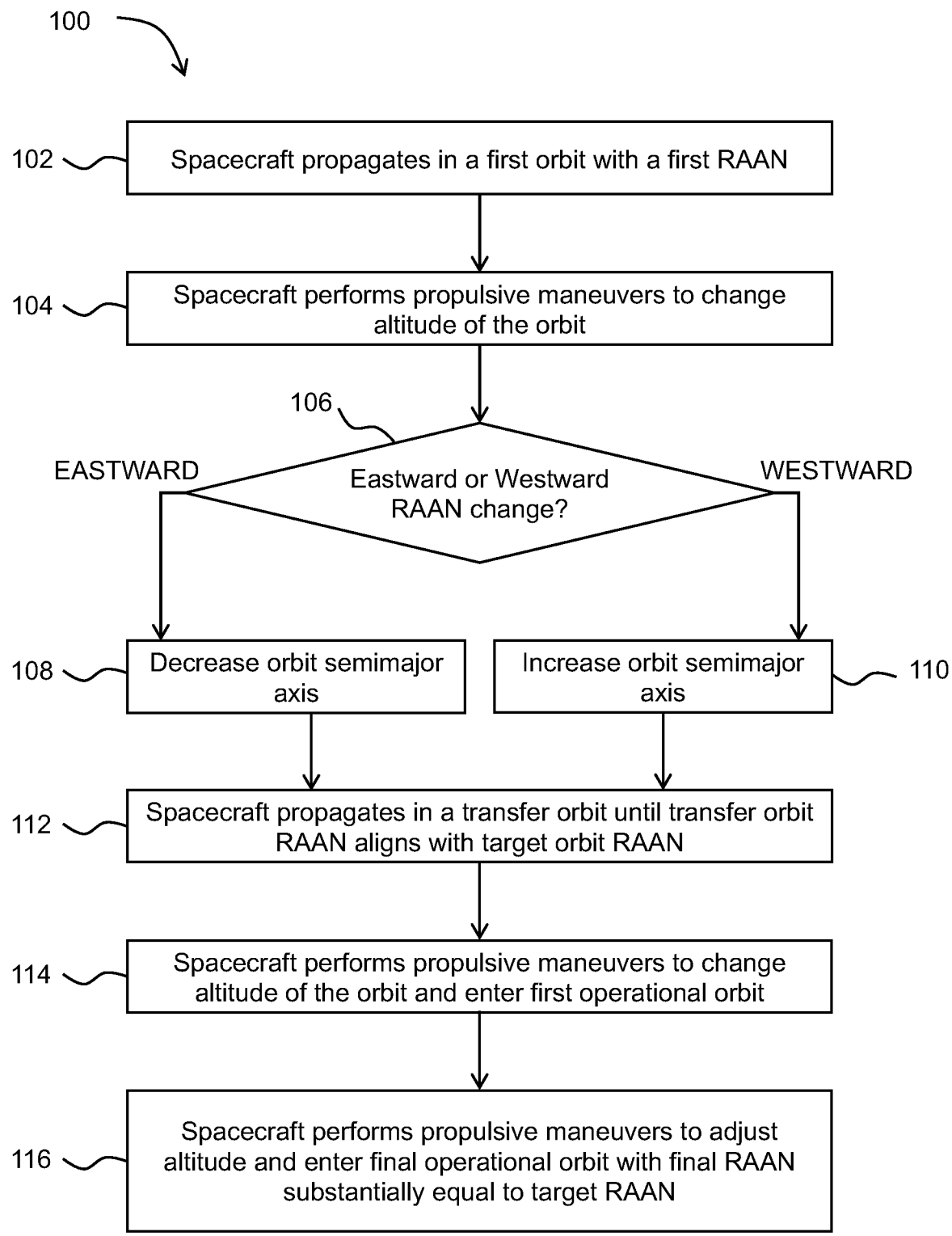
FIG. 1 is a flow diagram of a first method of moving a spacecraft from a first orbit to a final orbit, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "compromising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As noted above, space articles are moved between orbits for a variety of reasons. Satellites frequently require repositioning in order to achieve a certain operational trajectory from a launch vehicle or to meet changing operational requirements. For example, Sun-synchronous orbits are a class of orbits frequently used by Earth-observing satellite constellations. Such constellations typically include multiple satellites that are spaced apart over multiple different orbits to achieve a desired viewable ground coverage of the Earth. The multiple orbits generally have similar semimajor axes, eccentricities, and inclinations, but have different RAAN values. Within the industry, RAAN may also be referred to as a Longitude of Ascending Node ("LAN") and a Local Time of the Ascending Node ("LTAN"). RAAN, LAN, and LTAN each describe the orientation of an orbit based on the location at which the orbit crosses the equatorial plane from the southern hemisphere into the northern hemisphere. For every reference of LTAN and LAN, there is an equivalent RAAN. For consistency throughout the following description, the term RAAN will be used.

Earth has an oblate shape rather than a perfectly spherical shape. This oblateness perturbs spacecraft orbits in such a way that the orbit is not fixed, but will instead experience orbital precession (e.g., a slow change in orbital parameters) over time. The RAAN of an orbit is one such orbital parameter that may be affected. The rate of orbital precession of RAAN depends upon the inclination, semimajor axis, and eccentricity of the orbit. In view of the above, it is often necessary to adjust the orbit of a space article (e.g., a spacecraft, a satellite, etc.) over time.

Performing large RAAN changes propulsively requires high, often prohibitive, amounts of fuel. Instead of relying on pure propulsion, other methods of changing RAAN that require less fuel have been developed. Orbits at different altitudes or different orbit radii experience RAAN precession at different rates. Taking advantage of this fact, spacecraft may instead use a small amount of fuel to raise or lower their orbit to a particular altitude and wait in the raised or lowered orbit until differential RAAN precession rates produce a desired orbit change. One method using this concept is illustrated in FIG. 1.

Method 100 for changing the RAAN of an orbit involves the following steps as outlined in FIG. 1. Step 102 includes providing a space article (e.g., a spacecraft) that is propagating in a first orbit. The first orbit is at a first altitude and has a first RAAN. Orbit altitudes may alternatively be described in terms of orbit radius. In step 104, the spacecraft performs propulsive maneuvers (e.g., selectively activates thrusters) to change (e.g., increase or decrease) an altitude or radius of its orbit. This orbital altitude or radius change inherently causes a change to the rate of orbital precession due to J2. effects caused by Earth's oblateness. At decision block 106, a determination is made about the direction of the desired RAAN change. To execute an eastward RAAN change, the orbit's semimajor axis is decreased at step 108. Alternatively, to execute a westward RAAN change, the orbit's semimajor axis is increased at step 110. The altitude-adjusted orbit is referred to as a transfer orbit and the spacecraft propagates in the transfer orbit at step 112. A target RAAN for a final orbit may be pre-determined and provided as an input at or before step 112. The transfer orbit will precess either more slowly or more quickly than the target orbit, depending on the relative inclination, eccentricity and semimajor axis of the orbits. Over time propagating in the transfer orbit, J2 precession will align the spacecraft's orbit (e.g., the RAAN of the transfer orbit) with the target orbital plane (e.g., the RAAN of the target orbit). Once the transfer orbit RAAN is sufficiently aligned with the target orbit RAAN, the spacecraft performs additional propulsive maneuvers at step 114. The propulsive maneuvers of step 114 move the spacecraft into a first operational orbit by raising or lowering its semimajor axis.

At step 116, the spacecraft may perform final propulsive maneuvers to move the spacecraft into a final operational orbit with a final operational altitude or radius and a final RAAN. It is noted that the final operational orbit, as achieved using the described method, is substantially different from an orbit achieved using conventional methods, as changing RAAN is a crucial part of a spacecraft's mission design as RAAN changes require large amounts of fuel to execute. The propellant fuel cost to return the spacecraft to the final operational altitude is nearly equal to the cost to enter the transfer orbit initially. These maneuvers into and out of the transfer orbit can consume a large fraction of a spacecraft's propellant reserves. To save on fuel, a spacecraft may make smaller orbit differences between the initial orbit and transfer orbit, and between the transfer orbit and final orbit. However, this approach results in smaller differential RAAN precession and thus requires the spacecraft to propagate in the transfer orbit for significantly longer times before the target orbital plane is reached.

Figure 2:
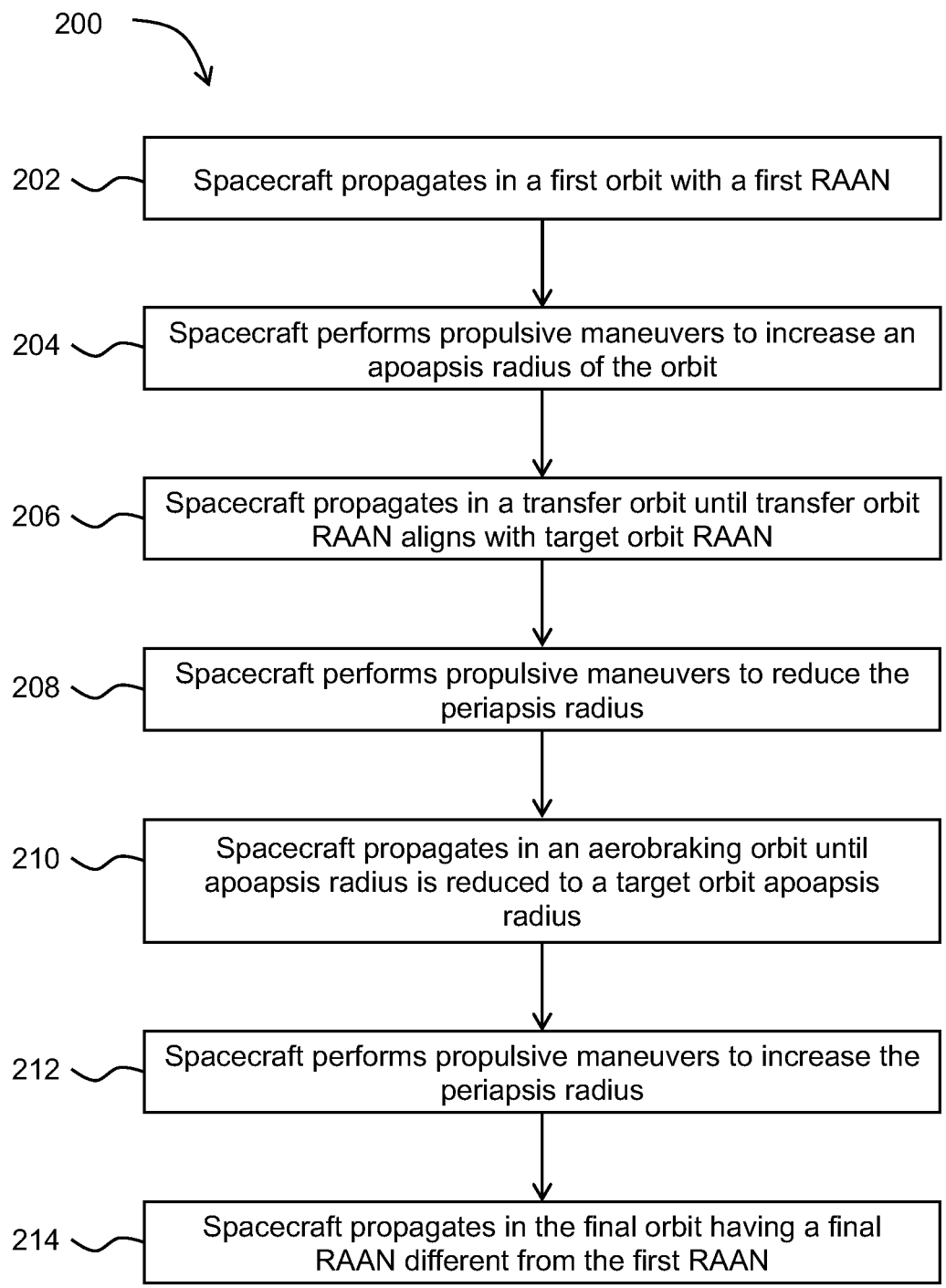
FIG. 2 is a flow diagram of a second method of moving a spacecraft from a first orbit to a final orbit using aerodynamic drag, in accordance with an embodiment.

A method 200 for changing the RAAN of an orbit is described with respect to FIG. 2 and will be further described with respect to schematic FIGS. 3A-3F below. The method 200 has advantages over the method 100. In particular, the method 200 reduces the amount of total fuel required to move a space article to a desired orbit and may thereby extend the space article's capabilities and operational lifetime. Fuel savings advantages are particularly evident for large changes of RAAN. The reduced fuel consumption between orbits may allow for more variation from initial orbit to transfer orbit and from transfer orbit to final orbit. This allows the space article to take advantage of larger differential RAAN precession and may reduce the total time associated with moving from the initial orbit to the final orbit.

Method 200 for changing the RAAN of an orbit begins at step 202 where a space article (e.g., a spacecraft) is provided and propagates in a first orbit. The first orbit has a first RAAN and a first orbit radius. At step 204, the space article performs propulsive maneuvers (e.g., by activating thrusters) to increase an apoapsis radius, thereby moving the space article into a transfer orbit. The space article may be a self-propelled spacecraft that has its own thrusters or may be a spacecraft coupled to an orbital transfer vehicle with thrusters. The propulsive maneuvers may include near-impulsive high thrust firings and/or low-thrust propulsion. In some embodiments, the transfer orbit periapsis radius may remain substantially equal to the first orbit radius. The difference between the apoapsis radius and the periapsis radius results in an increase in eccentricity of the transfer orbit with a larger semimajor axis than the initial orbit. Inclination between the first orbit and the transfer orbit may remain constant. It is noted that method 200 applies to increasing a semimajor axis such that it may improve performance for westward transfers for retrograde orbits (e.g., sun synchronous orbits) or eastward transfers for prograde orbits.

As described above, there is a differential RAAN between the first orbit and the transfer orbit. Relative to the first orbit, the transfer orbit has a lower rate of precession which results in a net rate of change in the RAAN between the first orbit and the transfer orbit. The relative precession rate (i.e., the difference in RAAN precession of a target orbit and a transfer orbit) due to J2 can be computed based on the orbital elements of each orbit. The transfer orbit can therefore be selected to achieve a desired relative RAAN drift rate. The desired transfer orbit may be determined through an optimization of the amount of fuel required to achieve the transfer orbit and the duration required for the transfer. At step 206 the space article propagates in the transfer orbit and the cumulative effects of the lower precession cause the transfer orbit RAAN to align with the target orbital plane (e.g., a target RAAN of a pre-defined target orbit). The time over which this RAAN alignment occurs may be shortened or lengthened as a function of the transfer orbit apoapsis radius. In some embodiments, the transfer orbit may be particularly useful as an inter-mission staging orbit for orbital transfer vehicles. By propagating in the transfer orbit, the orbital transfer vehicle is in position to rapidly and efficiently change orbital planes to facilitate prompt rendezvous with client space articles that are orbiting in the same orbital inclination but at different RAAN.

As the transfer orbit RAAN approaches the desired target value at step 208, the space article activates thrusters in the apoapsis region of the transfer orbit thereby reducing the periapsis radius and the periapsis altitude. This adjusted orbit is referred to as an aerobraking orbit. In the aerobraking orbit, the reduced periapsis radius brings the periapsis region of the orbit closer to Earth and the drag effects of Earth's atmosphere on the space article in this region are more pronounced. The atmospheric drag reduces the space article's orbital energy and passively decreases the apoapsis radius over time. Notably, the RAAN of the space article continues to precess during its time in the aerobraking orbit. This additional differential RAAN is accounted for when timing the change from transfer orbit to aerobraking orbit. In some embodiments, the timing instructions are provided based on simulation data.

It is noted that, while there is inherently some level of drag at low earth orbit, the present method describes the implementation of meaningful aero drag in the aerobraking periapsis phase. For example, drag in the order of magnitude of 0.1 to 10 Newtons would be useful within the present context, depending on the thermal loading limits for solar arrays and other components of the hardware system.

In some embodiments, other means for lowering an altitude of a portion of the transfer orbit into an aerobraking orbit may be used. For example, radial thrusting of the thrusters may be used to increase eccentricity of the transfer orbit without changing the semimajor axis. The desired outcome is to bring a portion of the transfer orbit to a sufficiently low altitude in order to subject the space article to atmospheric drag (e.g., in an aerobraking orbit). As described above, the atmospheric drag is then used to lower the rest of the orbit by reducing orbital energy.

The space article propagates in the aerobraking orbit at step 210 until the apoapsis radius of the aerobraking orbit is substantially equal to a target apoapsis radius. In some embodiments, the space article reaches the target apoapsis radius and the target RAAN substantially simultaneously. Once the aerobraking apoapsis radius is substantially equal to the target apoapsis radius and the aerobraking RAAN is substantially equal to the target RAAN, the space article activates thrusters at step 212 to increase the periapsis radius to a target periapsis radius. The increased periapsis radius reduces the aerodynamic drag effect on the space article and moves the space article to a final orbit that has a target RAAN, a target apoapsis radius, and a target periapsis radius. In some embodiments, the thruster actuation occurs in the apoapsis region of the aerobraking orbit. The thruster actuation may be performed either impulsively or using low-thrust propulsion solutions. The increased periapsis radius may be substantially equal to the apoapsis radius such that the final orbit is a substantially circular orbit.

An algorithm for controlling the space article's periapsis radius may be implemented to ensure safety while the space article is propagating in the aerobraking orbit. The algorithm may instruct thrusters on the space article to make small adjustments when the space article is in the apoapsis region of the orbit. The adjustments are configured to ensure that the orbit altitude in the periapsis region is within threshold of a target altitude. The periapsis radius must be sufficiently high (e.g., above approximately 100 km altitude depending on space weather conditions, which can change atmospheric density at a given altitude by a factor of 5× or more) to avoid excessive drag that could damage the space article and sufficiently low (e.g., below 130 km in most cases) to generate enough drag to allow the space article to converge on the desired orbital parameters within a desired time.

The space article propagates in the final orbit at step 214. The final orbit differs from the initial orbit in RAAN. The final orbit apoapsis radius may be the same as the first orbit apoapsis radius or may be different. Similarly, the final orbit periapsis radius may be the same as the first orbit periapsis radius or may be different. The target RAAN, apoapsis radius, and periapsis radius for the final orbit are selectable based on a pre-determined desired position of the space article. The inclination of the final orbit may be the same as the inclination of the first orbit. Other orbital parameters (e.g., semimajor axis, inclination, and argument of periapsis) may also be preserved between the first and the final orbits.

The method 200 is illustrated schematically with respect to FIGS. 3A-3F. In each figure, the orbit from a prior step is illustrated with dashed lines while current orbits are illustrated with solid lines to more clearly show changing sizes, shapes, and orientations of the various orbits during the transition from initial orbit to final orbit.

In FIG. 3A, step 202 of method 200 is shown from an orbit normal perspective. A space article 350 propagates in a first orbit 352 around the Earth 354. The first orbit 352 is approximately circular with an orbit radius 356. It may be determined that the space article needs to be repositioned to a new orbit that has a different RAAN than the first orbit. The desired target RAAN, target apoapsis radius, and target periapsis radius are defined. In some embodiments, the target orbit characteristics are used as inputs to a simulation that determines the amount of time the space article will spend in each intermediate orbit between the first orbit and the final orbit. The simulation may also provide information about specific thruster adjustments that should be made throughout the orbit change process.

FIG. 3B illustrates step 204 of method 200 in which the space article 350 activates thrusters to increase the orbit apoapsis radius 360 and moves into a transfer orbit 358'. The periapsis radius 362 may remain the same as first orbit radius 356. The transfer orbit 358' may reflect the orbit path when the space article first enters the transfer orbit. RAAN of the transfer orbit changes over time as illustrated by the precessed RAAN of transfer orbit 358" in FIG. 3C.

Step 208 of method 200 is illustrated in FIG. 3D. When the RAAN of transfer orbit 358" nears the target RAAN, the space article 350 activates thrusters to decrease the periapsis radius to an aerobraking orbit periapsis radius 364 and moves into an initial aerobraking orbit 366'. As the periapsis radius decreases, aerodynamic drag caused by the Earth's atmosphere acting on the space article decreases orbit energy. It is noted that the spacecraft can perform small maneuvers at apoapsis to mitigate drag effects on periapsis to keep a consistent/safe altitude. The reduction in orbit energy results in a decrease in apoapsis radius as the space article propagates in the aerobraking orbit. This is demonstrated in FIG. 3E, corresponding to step 210 from method 200, where aerobraking orbit 366" is the aerobraking orbit once the apoapsis radius 368 approaches the target apoapsis radius. Subsequently, the space article activates thrusters to perform propulsive maneuvers that increase the periapsis radius to a final periapsis radius 370 as illustrated in FIG. 3F. Thus, the space article 350 enters a final orbit 372. The final orbit 372 may have a final apoapsis radius 368 that is substantially equal to the final periapsis radius 370 and the final orbit 372 may be substantially circular. In some embodiments, the final periapsis and apoapsis radii may be substantially equal to the initial radius 356.

Figure 4:
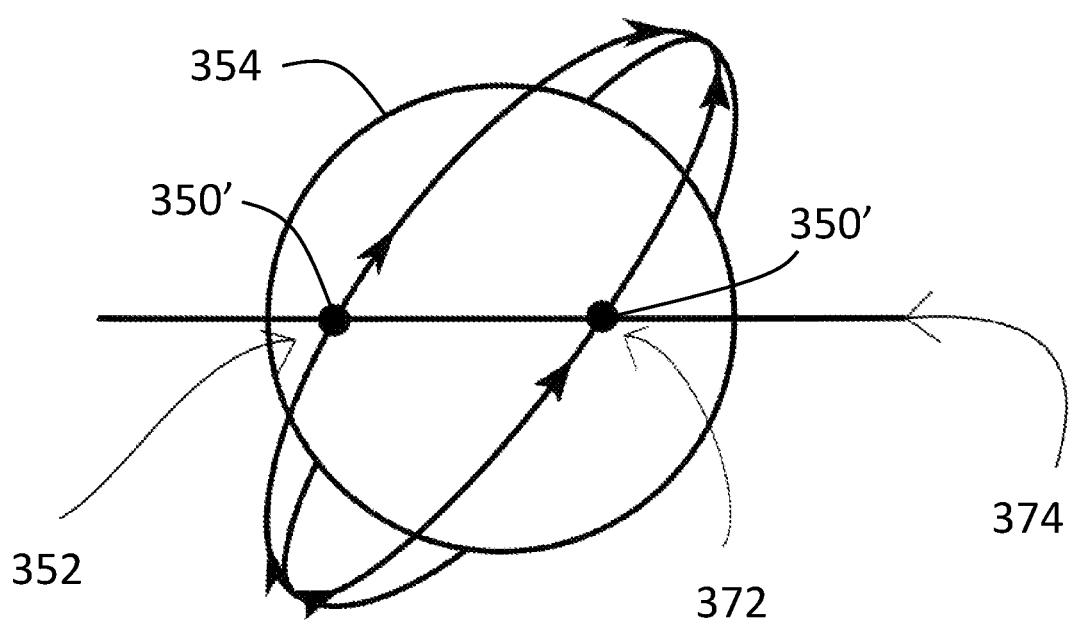
FIG. 4 illustrates a schematic view comparing a first orbit to a final orbit, in accordance with an embodiment.

FIG. 4 illustrates the Earth 354 and the equator 374 from an equatorial view. The difference between a first orbit 352 and a final orbit 372 is more clearly shown. The two orbits have substantially equal altitudes and radii but differ in RAAN. Space articles 350', 350" on the first and final orbit paths, respectively, are shown crossing the equator at different positions due to the difference in RAAN.

RAAN changes can be combined with changes in other orbital elements, such as changing the semimajor axis or inclination in tandem with the RAAN plane adjustment. This requires updating planning algorithms to maximize efficiency and achieve the desired final set of orbital elements. This can include dispensing spacecraft into multiple intermediate orbits, or picking up spacecraft from multiple intermediate orbits.

Further modifications to the above described embodiments are envisioned. For example, it is recognized herein that accurate navigation is critical to successful orbital transfer execution. Navigation approaches that may be integrated with the embodiments described herein may include, and are not limited to, the use of ground station ranging, on-board GPS measurements, localization based off landmarks or celestial features, and use of on-board accelerometers and gyroscopes.

Additionally, the maneuvering spacecraft's thrust vector and thrust magnitude should ideally be continually updated through a control algorithm, for example, in order to ensure accurate execution of the desired orbit change. Some relevant parameters to be considered in such a control algorithm may be determined by mission requirements and may include available propellant, efficiency, power availability and sun pointing availability, and objectives including time available for the maneuver and radiation tolerance. Moreover, feedback mechanisms between monitored thrust, location/velocity determination from external (or internal) sensing resources may be used to further refine the maneuvering process.

These factors, and others, may be combined with navigation information and control algorithms to determine, for instance, when thrusters should be fired, for how long, and in what orientation to follow the target trajectory in an optimal or near-optimal manner. Further refinements may consider time (e.g., desired time to get to the desired plane), available thrust mechanisms, power, propellant availability, and other spacecraft, and location parameters such as altitude and proximity with respect to other spacecraft or gravitational sources (e.g., planets, stars).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

The invention claimed is:

1. A method of moving a spacecraft from an initial orbit to a final orbit, the method comprising:
    providing a spacecraft with thrusters traveling in an initial orbit, wherein the initial orbit has an initial semimajor axis and an initial right ascension of the ascending node ("RAAN");
    defining a target RAAN, a target apoapsis radius, and a target periapsis radius for a final orbit;
    activating the thrusters such that the spacecraft moves from the initial orbit to a transfer orbit, wherein the transfer orbit comprises:
        a transfer orbit semimajor axis with more eccentricity than the initial semimajor axis;
        a transfer orbit periapsis region having a transfer orbit periapsis radius; and
        a transfer orbit RAAN, wherein the transfer orbit RAAN changes with each revolution in the transfer orbit due to earth's oblateness;
    propagating the spacecraft in the transfer orbit until the second RAAN is substantially equal to the target RAAN;
    activating thrusters when the spacecraft is in the transfer orbit apoapsis region to reduce the transfer orbit periapsis radius such that the spacecraft moves from the transfer orbit to an aerobraking orbit, wherein the aerobraking orbit comprises:
        an aerobraking orbit apoapsis radius; and
        an aerobraking orbit periapsis region having an aerobraking orbit periapsis radius;
    reducing an orbit energy of the spacecraft by exposing the spacecraft to atmospheric drag; and
    propagating the spacecraft in the aerobraking orbit until the aerobraking orbit apoapsis radius is substantially equal to the target apoapsis radius; and
    activating the thrusters over one or more orbits to increase the aerobraking orbit periapsis radius such that the spacecraft travels in a final orbit, the final orbit comprising:
        a final RAAN substantially equal to the target RAAN;
        a final apoapsis radius substantially equal to the target apoapsis radius; and
        a final periapsis radius substantially equal to the target periapsis radius.

2. The method of claim 1, wherein eccentricity of the initial orbit is approximately zero.

3. The method of claim 2, wherein the first orbit is a low earth orbit.

4. The method of claim 1, wherein eccentricity of the final orbit is approximately zero.

5. The method of claim 4, wherein the final orbit is a low earth orbit.

6. The method of claim 1, wherein eccentricity of the transfer orbit is greater than zero.

7. The method of claim 1, wherein eccentricity of the aerobraking orbit is greater than zero.

8. The method of claim 1, wherein activating the thrusters comprises one selected from a group consisting of near-impulsive high thrust firings and low-thrust firings.

9. The method of claim 1, wherein the spacecraft maintains a same inclination between the initial orbit and the transfer orbit.

10. The method of claim 1, wherein the spacecraft comprises an orbital transfer vehicle coupled with a space article.

11. The method of claim 10, wherein the space article comprises at least one satellite.

12. The method of claim 1, wherein the exposing the spacecraft to atmospheric drag comprises increasing the atmospheric drag within the aerobraking orbit periapsis region.

13. The method of claim 1, wherein reducing an orbit energy of the spacecraft comprises reducing a velocity of the spacecraft.

14. The method of claim 1, wherein the initial RAAN is different from the final RAAN.

15. The method of claim 14, wherein the initial orbit has an initial apoapsis radius substantially equal to the final apoapsis radius and an initial periapsis radius substantially equal to the final periapsis radius.

16. A method of moving a spacecraft from an initial orbit to a final orbit, the method comprising:
   providing a spacecraft with thrusters traveling in an initial orbit, wherein the initial orbit has an initial semimajor axis and an initial right ascension of the ascending node ("RAAN");
   defining a target RAAN, a target apoapsis radius, and a target periapsis radius for a final orbit;
   activating the thrusters such that the spacecraft moves from the initial orbit to a transfer orbit, wherein the transfer orbit comprises eccentricity greater than zero and wherein a transfer orbit RAAN approaches the target RAAN;
   activating thrusters when the spacecraft is in a first region of the transfer orbit such that the spacecraft moves from the transfer orbit to an aerobraking orbit;
   reducing an orbit energy of the spacecraft by exposing the spacecraft to atmospheric drag; and
   propagating the spacecraft in the aerobraking orbit until an aerobraking orbit apoapsis radius is substantially equal to the target apoapsis radius; and
   activating the thrusters such that an aerobraking orbit periapsis radius is substantially equal to the target periapsis radius; and
   propagating the spacecraft in the final orbit, the final orbit comprising:
      a final RAAN substantially equal to the target RAAN;
      a final apoapsis radius substantially equal to the target apoapsis radius; and
      a final periapsis radius substantially equal to the target periapsis radius.

17. The method of claim 16, wherein eccentricity of the final orbit is approximately zero.

18. The method of claim 16, wherein activating the thrusters comprises one selected from a group consisting of near-impulsive high thrust firings and low-thrust firings.

19. The method of claim 16, wherein the spacecraft comprises an orbital transfer vehicle coupled with a space article.

20. The method of claim 19, wherein the space article comprises at least one satellite.

* * * * *